US012563277B2

(12) United States Patent
Gallusser

(10) Patent No.: US 12,563,277 B2
(45) Date of Patent: Feb. 24, 2026

(54) USER-CUSTOMIZED ALREADY VIEWED VIDEO SUMMARY

(71) Applicant: Disney Enterprises, Inc., Burbank, CA (US)

(72) Inventor: Fabian L. Gallusser, Palo Alto, CA (US)

(73) Assignee: Disney Enterprises, Inc., Burbank, CA (US)

( * ) Notice: Subject to any disclaimer, the term of this patent is extended or adjusted under 35 U.S.C. 154(b) by 51 days.

(21) Appl. No.: 18/416,791

(22) Filed: Jan. 18, 2024

(65) Prior Publication Data

US 2025/0240504 A1 Jul. 24, 2025

(51) Int. Cl.
*H04N 21/8549* (2011.01)

(52) U.S. Cl.
CPC .............................. *H04N 21/8549* (2013.01)

(58) Field of Classification Search
CPC ................................................. H04N 21/8549
USPC ......................................................... 386/241
See application file for complete search history.

(56) References Cited

U.S. PATENT DOCUMENTS 8,386,935 B2 * 2/2013 van Zwol ........... G06F 3/04817
715/723
9,826,285 B1 * 11/2017 Mishra ................... G06V 20/41

9,860,613 B2 * 1/2018 Kishore ........... H04N 21/47202
10,455,297 B1 * 10/2019 Mahyar .............. H04N 21/4532
10,469,918 B1 * 11/2019 Carlson ................. G06F 16/783
11,089,345 B2 8/2021 Solaro et al.
11,451,885 B1 * 9/2022 Chandrashekar ..... G06F 40/166
11,733,854 B2 * 8/2023 Cho ................... H04N 21/4884
715/719
2015/0334472 A1 * 11/2015 Kishore ............. H04N 21/8549
725/32
2019/0272082 A1 * 9/2019 Johansson ........... G06F 3/04842
2023/0016521 A1 * 1/2023 Dhiman ............. H04N 21/2747
2023/0291972 A1 * 9/2023 Panchaksharaiah ........................
H04N 21/4788
2024/0080515 A1 * 3/2024 Harb ................... H04N 21/4312
2024/0215881 A1 * 7/2024 Henderson ............. A61B 5/165
2024/0259654 A1 * 8/2024 Gupta ................ H04N 21/4532
2025/0080778 A1 * 3/2025 Gallusser .............. H04N 21/84
2025/0113089 A1 * 4/2025 Puniyani ............ H04N 21/8549
2025/0203177 A1 * 6/2025 Xu ..................... H04N 21/4333

* cited by examiner

*Primary Examiner* — Helen Shibru
(74) *Attorney, Agent, or Firm* — Patterson + Sheridan, LLP; Gero G. McClellan

(57) ABSTRACT

Techniques for identifying a plurality of scenes relating to a first content item and selecting, using a computing system, two or more scenes, of the plurality of scenes, for a customized content summary for a user are disclosed. This includes identifying a point in time when the user stopped consuming the first content item and selecting the two or more scenes based on the identified point in time. The selected two or more scenes were previously presented to the user, prior to the point in time when the user stopped consuming the first content item. The techniques further include generating the customized content summary, using the computing system, by combining the selected two or more scenes.

20 Claims, 6 Drawing Sheets

USER-CUSTOMIZED ALREADY VIEWED VIDEO SUMMARY

BACKGROUND

Viewers of streaming content are sometimes interrupted during viewing, and attempt to continue viewing later. But the barrier to entry of returning to view the content can increase over time, because the viewer will have decreasing recollection of where they stopped, what they have already seen, what was happening, and other details of the content. This can include lack of recollection of prior occurrences in a current content item (e.g., a movie or television episode interrupted during viewing, an audio content item interrupted during listening, a graphic novel interrupted during reading, or any other suitable content item) and lack of recollection of prior, related, content items (e.g., an earlier movie in a series of movies, an earlier television episode, an earlier audio content item in a series of audio content items, or any other suitable content items).

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

Figure 1A:
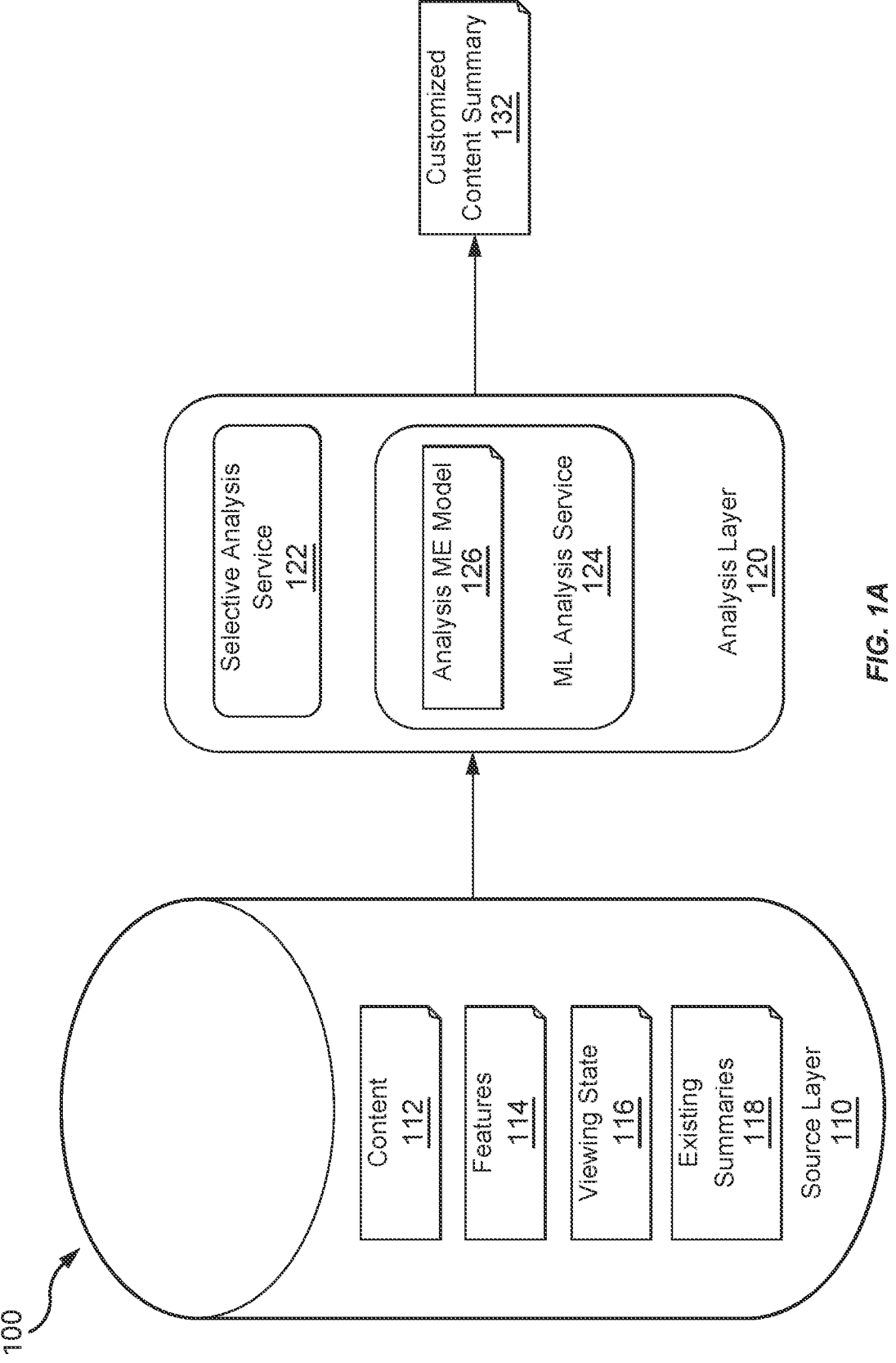
FIG. 1A is a block diagram illustrating a computing environment for generating customized content summaries, according to at least one embodiment.

Providing the user with a customized summary of prior occurrences can significantly improve the viewing experience, and increase the likelihood of the user returning to view the content, by reducing the barrier to re-entry. But this is a technically challenging problem. For example, a given video content item (e.g., an episode of a television show or a movie) can have multiple seasons of prior or related television show content, each season made up of numerous episodes, multiple prior or related movies, or any other suitable prior or related content. Similarly, a given audio content item (e.g., a podcast or audiobook) can have multiple related content items (e.g., other podcasts or books in a series). Identifying which content should be included in a customized summary is qualitatively challenging, because it is difficult to tell what will be most important for a given user at a given time, and computationally challenging, because analyzing voluminous prior content for each user can be very computationally expensive (e.g., in a platform with a large number of users). While the description below uses viewing video content as one example, one or more of these techniques can be applied to consuming any suitable content (e.g., listening to audio content, reading written content, reviewing experiential content, or consuming any other suitable content in any suitable manner). For example, one or more techniques described below can be applied to summaries for audio content (e.g., podcasts), written content (e.g., books or graphic novels), experiential content (e.g., vacations, events, or other experiences), or any other suitable content.

For example, content can be divided into scenes (e.g., using a suitable ML model, through curated view, or using any other suitable technique). But determining which scenes should be included in a customized content summary for a given viewer, stopping at any arbitrary time in the content, is both qualitatively difficult and computationally expensive: it is difficult to determine what content should be included in the customized summary (e.g., to improve the user experience), and it is very computationally expensive to analyze a large number of content scenes to generate a summary associated with any arbitrary stopping point.

In an embodiment, these challenges can be alleviated using one or more techniques described herein. As one example, existing summary information can be used to generate a customized content summary. For example, many television shows and other content items include a curated summary at the outset of the show. This can include, as one example, a previously-on summary (e.g., generated by the content creator) that describes relevant prior material that is recommended for viewing before starting a new content item. As another example, the existing summaries can include a trailer for a content item (e.g., a trailer for a movie or television show) that includes a selection of scenes from the content item, and potentially related content items.

As discussed further below, these existing summaries can be used to identify relevant related content, for a given content item, and can be used to generate a customized summary for a user. In an embodiment, this provides a significant technical advantage over other solutions. For example, using existing summaries (as opposed to complete prior or related content items) provides significant computational savings by avoiding analysis of complete content items and large numbers of scenes, and instead focusing on much shorter, already existing summaries. Instead of requiring computational analysis of all scenes from prior or related content, the analysis can be limited to, or focused on, scenes included in existing summaries. This saves significant memory (e.g., working memory while generating a customized content summary) and computational resources (e.g., processing resources used to analyze the content scenes for suitability in a customized content summary).

Alternatively, or in addition, machine learning (ML) can be used to generate a customized summary of prior occurrences. A suitable ML model (e.g., a suitable supervised machine learning model) can be trained using any combination of full content items (e.g., prior or related movies and television shows) and existing summaries (e.g., previously-on summaries and trailers). The ML model can identify suitable features using the training data (e.g., dialogue, lighting, pacing, timestamp data, or any other suitable features) to determine a probability that any given content scene should be included in a customized content summary. The ML model can then be used to infer a customized summary for a given content item, using these features. In an embodiment, this also provides significant technical advantages, by allowing for accurate inference of a customized content summary using an ML model (e.g., a previously-trained supervised ML model) as opposed to requiring a rules-based analysis of a potentially-very-large number of content scenes. Further, using a trained ML model can shift the computational burden from run-time (e.g., when a large number of users are requesting customized content summaries) to an earlier training phase. Particularly for a large deployment, with potentially millions of users, allowing for rapid inference of a customized content summary and shifting the computational burden to an earlier training phase is a significant advantage.

FIG. 1A is a block diagram illustrating a computing environment 100 for generating customized content summaries, according to at least one embodiment. In an embodiment, the computing environment 100 includes a source layer 110. For example, the source layer 110 can include content 112 and other data for an analysis layer 120 to generate a customized content summary 132. In an embodiment, the content 112 can include prior content (e.g., television shows or movies occurring earlier in a sequential series of content items) used as source material for the customized content summary 132. In one embodiment, the content 112 is divided into scenes prior to being used to generate the customized content summary 132. The content 112 can be divided into scenes using a suitable ML model (e.g., a supervised ML model), another automated technique (e.g., a rules based technique), or by human review. Alternatively, or in addition, the content 112 includes complete content items (e.g., complete television shows or movies). In an embodiment, the content relates to a sequential series of items (e.g., a sequential series of television shows, a sequential series of movies, a sequential series of audio content, a sequential series of written content, a sequential series of experiential content, or any other sequential series of content items).

In an embodiment, the source layer 110 further includes one or more features 114. For example, the features 114 can be extracted from the content 112 (e.g., using an ML model) and used to generate the customized content summary 132. The features 114 can include dialogue data, lighting data, pacing data, timestamp data, and any other suitable data. In one embodiment, the features 114 are extracted from the content 112 and provided to an analysis layer 120 for generating the customized content summary 132. Alternatively, or in addition, the content 112 is provided directly to the analysis layer 120, and the analysis layer 120 identifies the features (e.g., using an ML model) as part of generating the customized content summary 132.

The source layer 110 can further include viewing state data 116. For example, the viewing state data 116 can identify where the relevant viewer (e.g., the viewer for whom the customized content summary 132 is generated) left off in viewing the content 112. This can include identifying the particular content item (e.g., the television show or movie) and the location within the content item (e.g., the timestamp where the viewer left off). The viewing state data 116 can further include a record of which content the viewer has actually viewed. For example, a viewing history could be used to identify what content the viewer has actually viewed, and that information could be used to generate an improved customized content summary 132.

In an embodiment, the source layer 110 further includes existing summaries 118. For example, the existing summaries 118 can include previously-on summaries (e.g., for one or more of the content items 112), trailers, or any other suitable existing summaries. While the source layer 110 is illustrated as one repository, this is merely for illustration. In an embodiment, any combination of the contents of the source layer can be maintained in any suitable electronic repositories, including suitable cloud storage locations (e.g., a public cloud, a private cloud, a hybrid cloud, or any other suitable cloud storage location), on-premises storage locations, other remote network storage locations, electronic databases (e.g., a relational database, a graph database, or any other suitable electronic database) or any other suitable electronic repositories In an embodiment, data from the source layer 110 is provided to the analysis layer 120, which generates the customized content summary 132 using one, or both, of a selective analysis service 122 and an ML analysis service 124. For example, the selective analysis service 122 can use existing summaries (e.g., the existing summaries 118) to generate the customized content summary 132 from the content 112 (e.g., using one or more of the features 114 and viewing state data 116). This is discussed further, below, with regard to FIG. 4. As another example, the ML analysis service 124 can use an analysis ML model 126 to infer the customized content summary 132 (e.g., based on one or more items in the source layer 110). This is discussed further, below, with regard to FIG. 5. In an embodiment, the customized content summary 132 provides a content summary for a user. This can include video content, audio content, or any other suitable content.

In an embodiment, the various components of the computing environment 100 communicate using one or more suitable communication networks, including the Internet, a wide area network, a local area network, or a cellular network, and uses any suitable wired or wireless communication technique (e.g., WiFi or cellular communication). Further, in an embodiment, the source layer 110 and the analysis layer 120 can be implemented using any suitable combination of physical computing systems, including cloud compute nodes and storage locations or any other suitable implementation.

For example, the source layer 110 and the analysis layer 120 could each be implemented using a respective server or cluster of servers. As another example, the source layer 110 and the analysis layer 120 can be implemented using a combination of compute nodes and storage locations in a suitable cloud environment. For example, one or more of the components of the source layer 110 and the analysis layer 120 can be implemented using a public cloud, a private cloud, a hybrid cloud, or any other suitable implementation.

Figure 1B:
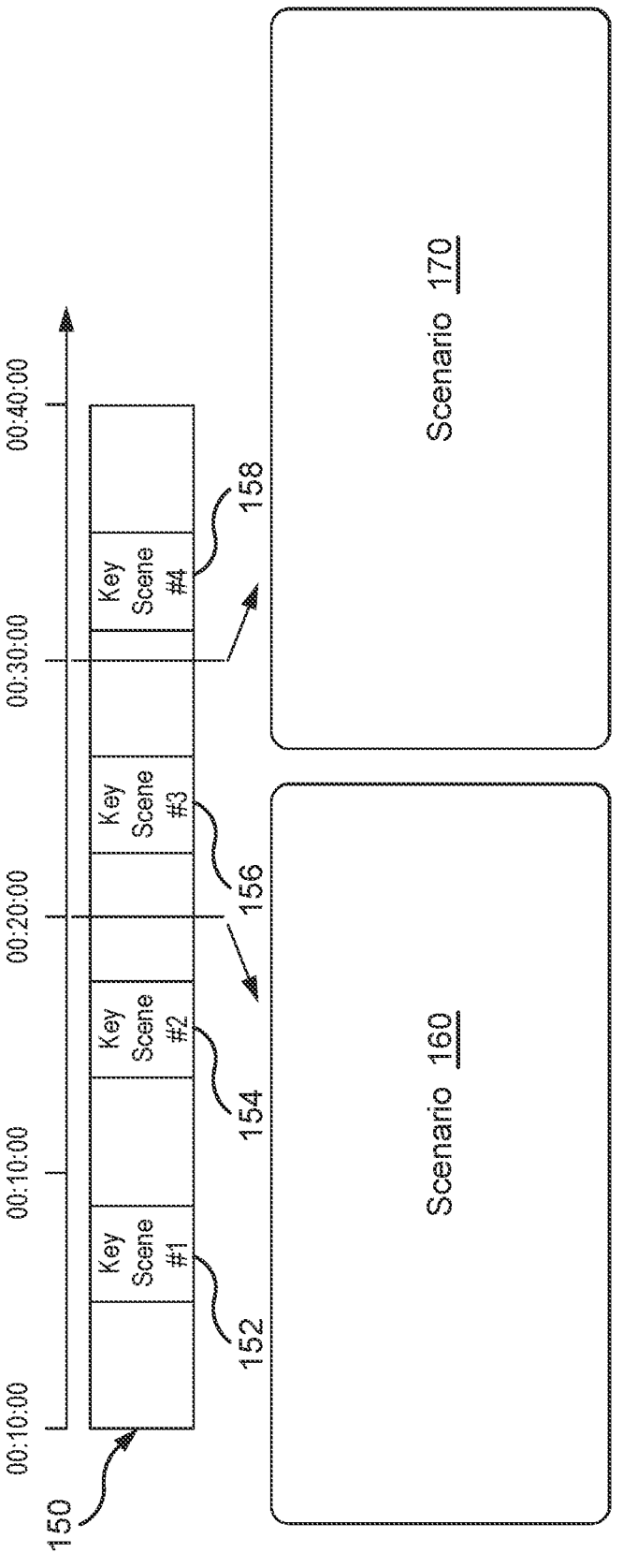
FIG. 1B illustrates examples of customized content summaries, according to at least one embodiment.

FIG. 1B illustrates examples of customized content summaries, according to at least one embodiment. Assume a content item 150 (e.g., a television show, movie, audio content item, or any other suitable content item) lasts forty minutes and includes four key scenes 152, 154, 156, and 158. In a scenario 160, a user stops viewing the content at the 20 minute mark, after seeing they key scene 154 but before seeing the key scene 156. The user then returns to the content at a later time (e.g., weeks later). The user can be prompted with an option to receiving a customized content summary, to remind the user of what happened before they stopped viewing the content. If the user chooses to receive the customized content summary, a summary is generated that includes the key scenes 152 and 154, but not the key scenes 156 and 158. This refreshes the user's memory, and the user continues with the content from the 20 minute mark where they stopped viewing the content.

In a scenario 170, by contrast, a user (e.g., a different user) stops viewing the content at the 30 minute mark, after they key scenes 152, 154, and 156, and before the key scene 158. The user then returns to the content at a later time (e.g., weeks later), is prompted for a customized content summary, and chooses to receive the customized content summary. This customized content summary, however, includes the first three key scenes 152, 154, and 156 (e.g., as opposed to only the first two key scenes 152 and 154 for the first scenario 160, discussed above). This is because the user has viewed 30 minutes of the content and all three of these scenes. Thus, the users receive different customized content summaries because they stop viewing the content at different times.

This is merely an example, and content summaries can be customized based on a variety of different factors. For example, the duration of time since a user viewed the content could be use in the customizing. In this example, a viewer that has recently viewed the content could be provided with a higher fraction of recent scenes in the customized content summary, while a viewer for whom a long period of time has elapsed since they paused viewing could be provided with more scenes from earlier content (e.g., to refresh the viewers recollection). As another example, a viewer that has recently viewed the content could be provided with a shorter customized content summary, compared with a viewer for whom a long period has elapsed.

Further, characteristics of the viewer can be used to generate the customized content summary. For example, viewer characteristics (e.g., viewing habits), preferences (e.g., selected or revealed preferences for particular content, preferred summary length, or any other suitable preferences), and other data can be used. For example, a viewer that is an avid viewer of a particular content item (e.g., a collection of TV shows or movies) could be assumed to be more aware of prior events in the content item and provided with a shorter customized summary, as compared to a viewer that is unfamiliar with the particular content item. These are merely examples, and any suitable factor(s) can be used. Further, in an embodiment, the customized content summary can be tailored based on a viewer's affinity (or lack of affinity) for a particular character, brand, content item, or other item. For example, a user's characteristics (e.g., selected preferences or viewing habits) could identify the user as having an affinity with a particular character in a content item (e.g., a character in a movie or television series). A customized content summary, for that user, could be generated to focus more on that character, as compared with a customized content summary for a user with no identified affinity or an affinity for a different character. In this way the content summary can be customized based on what a viewer has watched, a user's characteristics, or both, along with any other suitable factor(s).

Figure 2:
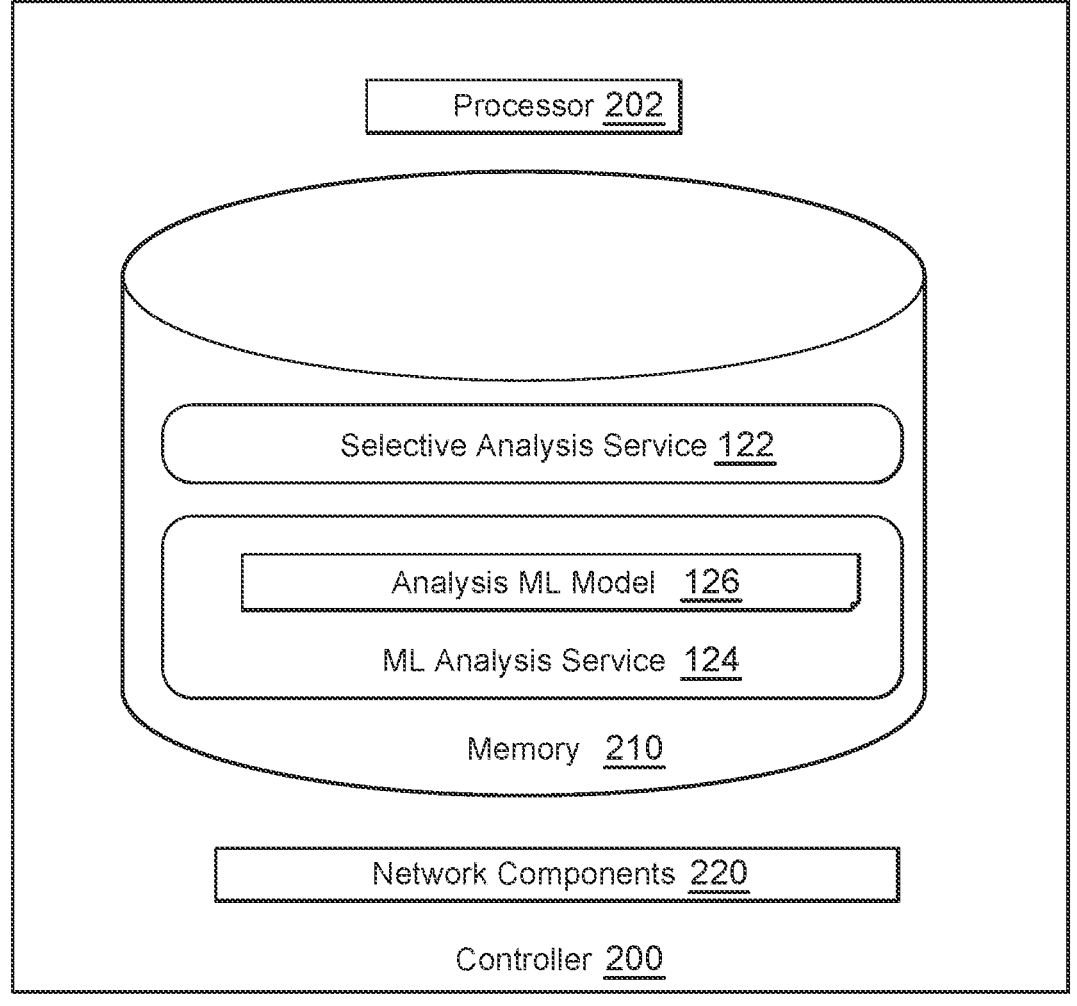
FIG. 2 is a block diagram illustrating a controller for generating customized content summaries, according to at least one embodiment.

FIG. 2 is a block diagram illustrating a controller 200 for generating customized content summaries, according to at least one embodiment. In an embodiment, the controller 200 corresponds with one aspect of the analysis layer 120 illustrated in FIG. 1. The controller 200 includes a processor 202, a memory 210, and network components 220. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like.

The network components 220 include the components necessary for the controller 200 to interface with components over a network (e.g., as illustrated in FIG. 1). For example, the controller 200 can be a part of the analysis layer 120, and the controller 200 can use the network components 220 to interface with remote storage and compute nodes using the network components (e.g., source layer 110 or any other suitable components). Alternatively, or in addition, the controller 200 can correspond with a different part of the computing environment 100.

The controller 200 can interface with other elements in the system over a local area network (LAN), for example an enterprise network, a wide area network (WAN), the Internet, or any other suitable network. The network components 220 can include wired, WiFi or cellular network interface components and associated software to facilitate communication between the controller 200 and a communication network.

Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory. The memory 210 generally includes program code for performing various functions related to use of the controller 200. The program code is generally described as various functional "applications" or "services" within the memory 210, although alternate implementations may have different functions and/or combinations of functions. Within the memory 210, a selective analysis service 122 facilitates generating a customized content summary using existing summaries (e.g., previously-on summaries, trailers, or any other suitable existing summaries). This is discussed further below with regard to FIG. 4. An ML analysis service 124 uses an analysis ML model 126 to facilitate generating a customized content summary using ML. This is discussed further below with regard to FIG. 5.

Although FIG. 2 depicts the selective analysis service 122, the ML analysis service 124, and the analysis ML model 126 as located in the memory 210, that representation is merely provided as an illustration for clarity. More generally, the controller 200 may include one or more computing platforms, such as computer servers for example, which may be co-located, or may form an interactively linked but distributed system, such as a cloud-based system (e.g., a public cloud, a private cloud, a hybrid cloud, or any other suitable cloud-based system). As a result, the processor 202 and memory 210 may correspond to distributed processor and memory resources within a computing environment.

Figure 3:
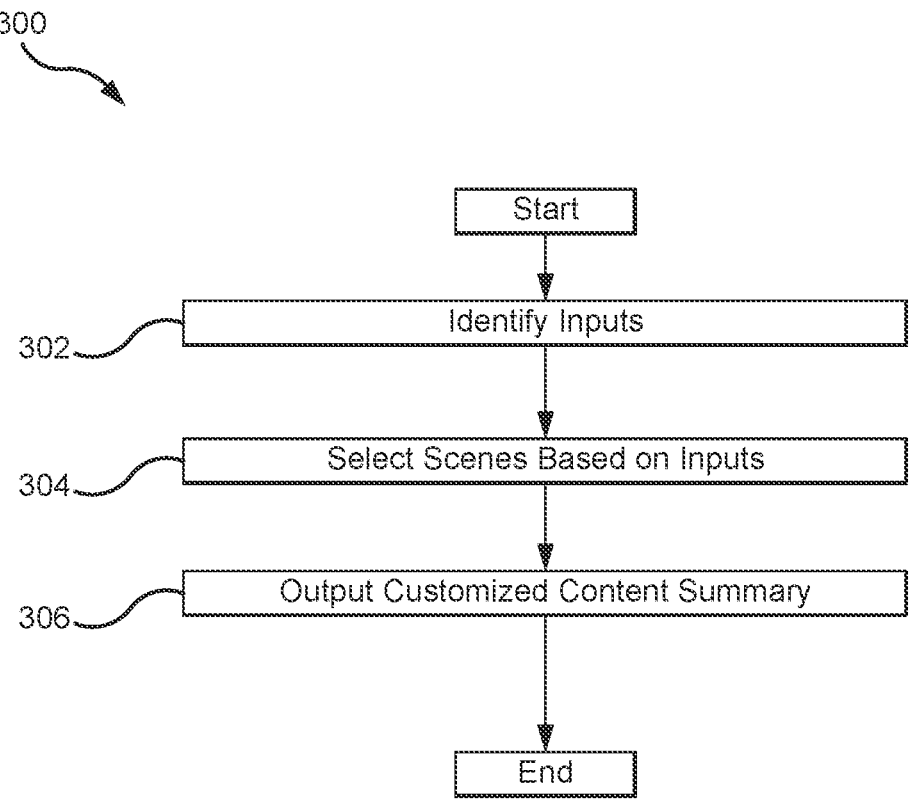
FIG. 3 is a flowchart illustrating generating customized content summaries, according to at least one embodiment.

FIG. 3 is a flowchart 300 illustrating generating customized content summaries, according to at least one embodiment. At block 302, an analysis service (e.g., the selective analysis service 122 or the ML analysis service 124 illustrated in FIGS. 1A and 2, or any other suitable service) identifies inputs. For example, the analysis service can use existing summary data (e.g., existing summaries 118 illustrated in FIG. 1A), along with content (e.g., the content 112 illustrated in FIG. 1) and viewing state data (e.g., the viewing state data 116 illustrated in FIG. 1A) as inputs to generate customized content summaries. Alternatively, or in addition, the analysis service can use content, features (e.g., the features 114 illustrated in FIG. 1A) and viewing state data as inputs to an ML model to infer customized content summaries.

At block 304, the analysis service selects scenes based on inputs. For example, the analysis service can use the existing summary data (e.g., previously-on summaries or trailers) to identify scenes in the input content for a customized summary, based on the viewing state data. This is discussed further, below, with regard to FIG. 4. Alternatively, or in addition, the analysis service can use an ML model to infer scenes from input content, to include in the customized content summary. This is discussed further, below, with regard to FIG. 5.

At block 306, the analysis service outputs a customized content summary. In an embodiment, the analysis service combines the selected scenes to generate the summary. In some instances, however, revisions or additional changes may be required. For example, additional voice over may be required to explain transitions between scenes, or scenes may need to be modified (e.g., expanded or cut) to improve the customized content summary (e.g., to fit within a particular duration). In an embodiment, the analysis service modifies the selected scenes, as necessary, to generate the customized content summary. This can be done automatically (e.g., using a suitable ML model or rules-based technique) or manually (e.g., through human analysis). Further, in an embodiment, additional material can be used to supplement the customized content summary. For example, a viewer may be presented with a content item that has a significant amount of prior content (e.g., a movie with several prior movies, a television series with many prior episodes or seasons, a book with several prior movies, an audio podcast with many prior episodes, or any other suitable content item). In addition to identifying scenes (or other selections) from prior content items, the analysis service can identify additional material to include in the customized content summary. For example, the analysis service can identify, or generate (e.g., using suitable structured or unstructured machine learning, or a combination thereof), voiceover to provide additional explanation for the customized content item. As another example, the analysis service can identify one or more repositories of additional content (e.g., maintained by a content provider, one or more third parties, or any other suitable entities) and use the repositories to select suitable content for the customized content summary, or can generate additional content (e.g., using suitable structured or unstructured machine learning, or a combination thereof) as necessary.

Figure 4:
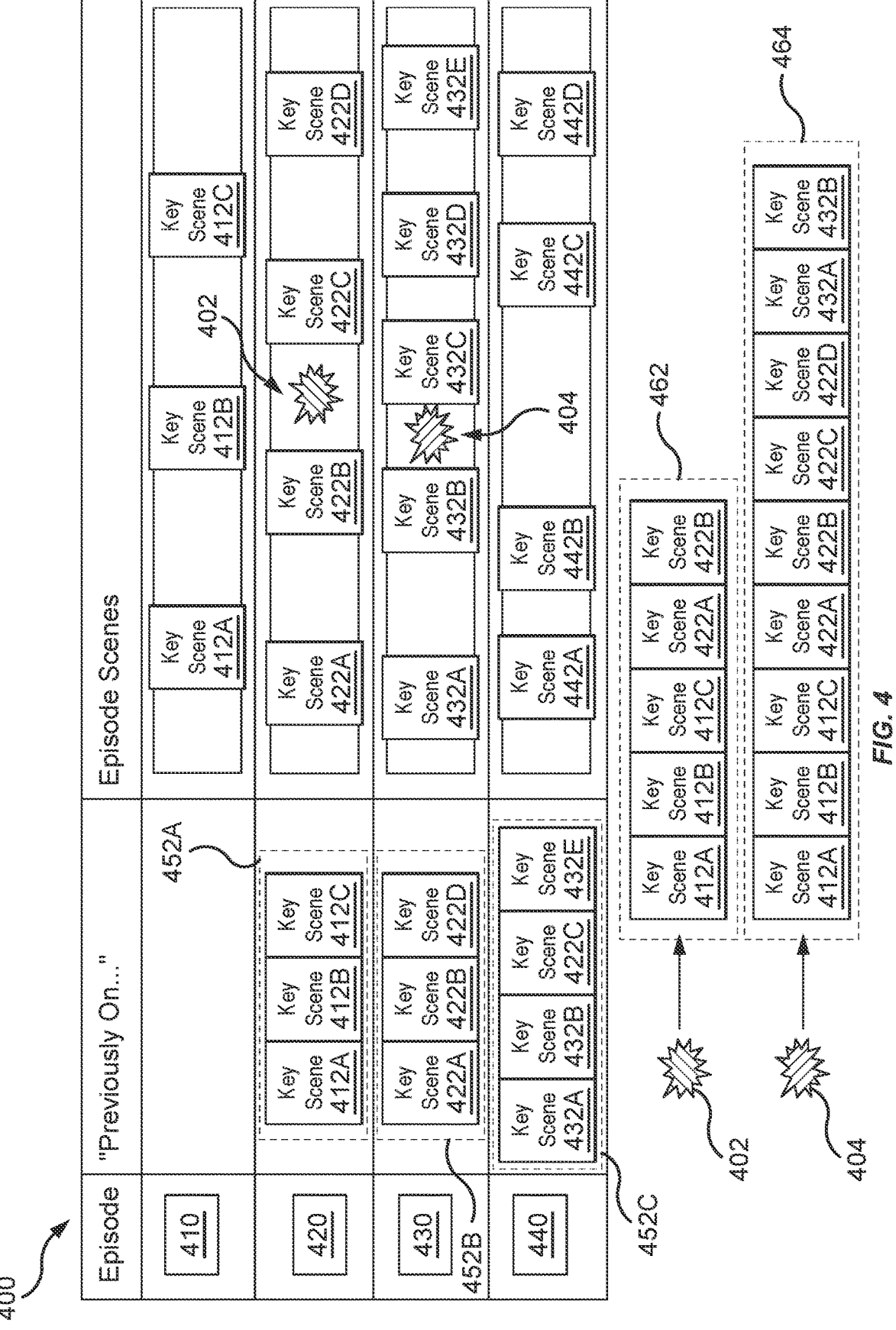
FIG. 4 illustrates generating customized content summaries using previously-on data, according to at least one embodiment.

FIG. 4 illustrates generating customized content summaries using previously-on data, according to at least one embodiment. An environment 400 includes multiple content items. For example, episodes 410, 420, 430, and 440 can be television episodes, episode in a movie franchise, podcast episodes, short video episodes, or any other suitable audio or video content. Each episode includes a number of scenes. For example, the episode 410 includes a number of scenes, including key scenes 412A-C. In an embodiment, the key scenes 412A-C are important for providing a customized content summary that includes the episode 410.

Further, in an embodiment, the episode 420 includes a number of scenes, including key scenes 422A-D. The episode 420 is also associated with an existing summary 452A. For example, the existing summary 452A can be a previously-on summary created to describe for a viewer the important aspects of prior episodes. In this case, the existing summary 452A includes the key scenes 412A-C from the prior episode 410. For example, the existing summary 452A can be a previously-on summary that includes key scenes from the earlier episode 410. In an embodiment, previously-on summaries may be more effective for customized content summaries than trailers, because trailers may intentionally obfuscate the plot of the content or leave out key scenes. Because the customized content summary provides a summary of content the viewer has, likely, already watched, these obfuscations are not necessary. This is merely an example, and trailers or other existing summaries may be very effective (e.g., in particular environments or for particular content or types of content).

Similarly, the episode 430 includes key scenes 432A-E, and an existing summary 452B. The existing summary 452B, for the episode 430, includes key scenes 422A, 422B, and 422D from the prior episode 420. In an embodiment, the episode 440 includes key scenes 442A-D, and an existing summary 452C. In this example, the existing summary 452C is a previously-on summary, and includes key scenes from both the immediately prior episode 430, and the earlier episode 420: key scenes 432A, 432B, 422C, and 432E. That is, the existing summary 452C is created to summarize aspects of both the episode 430 and the episode 420, to remind the viewer of information useful when viewing the episode 440 and improve the viewing experience.

Assume the viewer stops viewing the episode 420 during the episode, at the point 402 (e.g., at a point marked by a timestamp during the episode). An analysis service (e.g., the selective analysis service 122 illustrated in FIGS. 1A and 2, or any other suitable service) can generate a customized content summary for the viewer, based on the existing summaries 452A-C. Importantly, even though the viewer stops viewing during the episode 420, in an embodiment the analysis service can look to future existing summaries 452B and 452C (e.g., previously-on summaries for future episodes) to identify what earlier content (e.g., content from episodes 410 and 420) to include in the summary, while excluding future content (e.g., from episodes 430 and 440) from the summary (e.g., to avoid spoilers for the viewer).

In an embodiment, these existing summaries for future episode can provide useful data about what scenes are most important to include in the customized content summary. For example, a previously-on summary for the last episode in a season of television can include a scene from the first episode. An analysis service can determine to include this scene from the first episode, in a summary relating to the second episode, because the previously-on summary for the last episode in the season identifies that scene as important.

In the example of FIG. 4, the analysis service generates a customized content summary 462 associated with the viewer stopping viewing at the point 402. The customized content summary 462 includes the keys scenes 412A, 412B, 412C, 422A, and 422B. For example, the analysis service can use the existing summary 452A to identify the key scenes 412A, 412B, and 412C from the prior episode 410, and can include the key scenes 422A and 422B from earlier in the episode 420. In an embodiment, the customized content summary 462 can include scenes in chronological order (e.g., as previously presented), or in any other suitable order (e.g., based on an order presented in an existing summary or another preferred order).

As another example, assume a viewer (e.g., the same viewer or a different viewer) stops viewing the episode 430 at the point 404 (e.g., at a point marked by a timestamp during the episode. The analysis service can generate a customized content summary for the viewer, based on the existing summaries 452A-C. For example, the analysis service can generate a customized content summary 464 associated with the viewer stopping viewing at the point 404. The customized content summary 464 includes the key scenes 412A, 412B, 412C, 422A, 422B, 422C, 422D, 432A, and 432B.

For example, the existing summaries 452A and 452B include the key scenes 412A, 412B, 412C, 422A, 422B, and 422D. This leaves out the key scene 422C, from the episode 420. But the analysis service can analyze the future existing summary 452C, which includes the key scene 422C. The analysis service can use this to determine that the key scene 422C should also be included in the customized summary 464.

While FIG. 4 focuses on the use of existing summaries to generate the customized content summaries 462 and 464, as discussed above in relation to FIG. 1A this is merely one factor that can be used to select scenes for the customized content summaries. In an embodiment, characteristics of the content (e.g., the features 114 illustrated in FIG. 1A), viewer characteristics (e.g., viewing state data 116 illustrated in FIG. 1A), and any other suitable data can be used. For example, this data can be combined with the existing summary data to select scenes for the customized content summaries 462 and 464. In an embodiment, a weight or probability can be applied to particular scenes or portions of content based on content or viewer characteristics. For example, the likelihood of including a particular scene in a customized content summary could change based on the duration of time since a viewer viewed the scene (e.g., where a long duration has passed since a viewer was presented with a particular scene, that scene could have a weight or probability applied to increase the likelihood that scene will be included in the customized content summary). This is merely an example.

Figure 5:
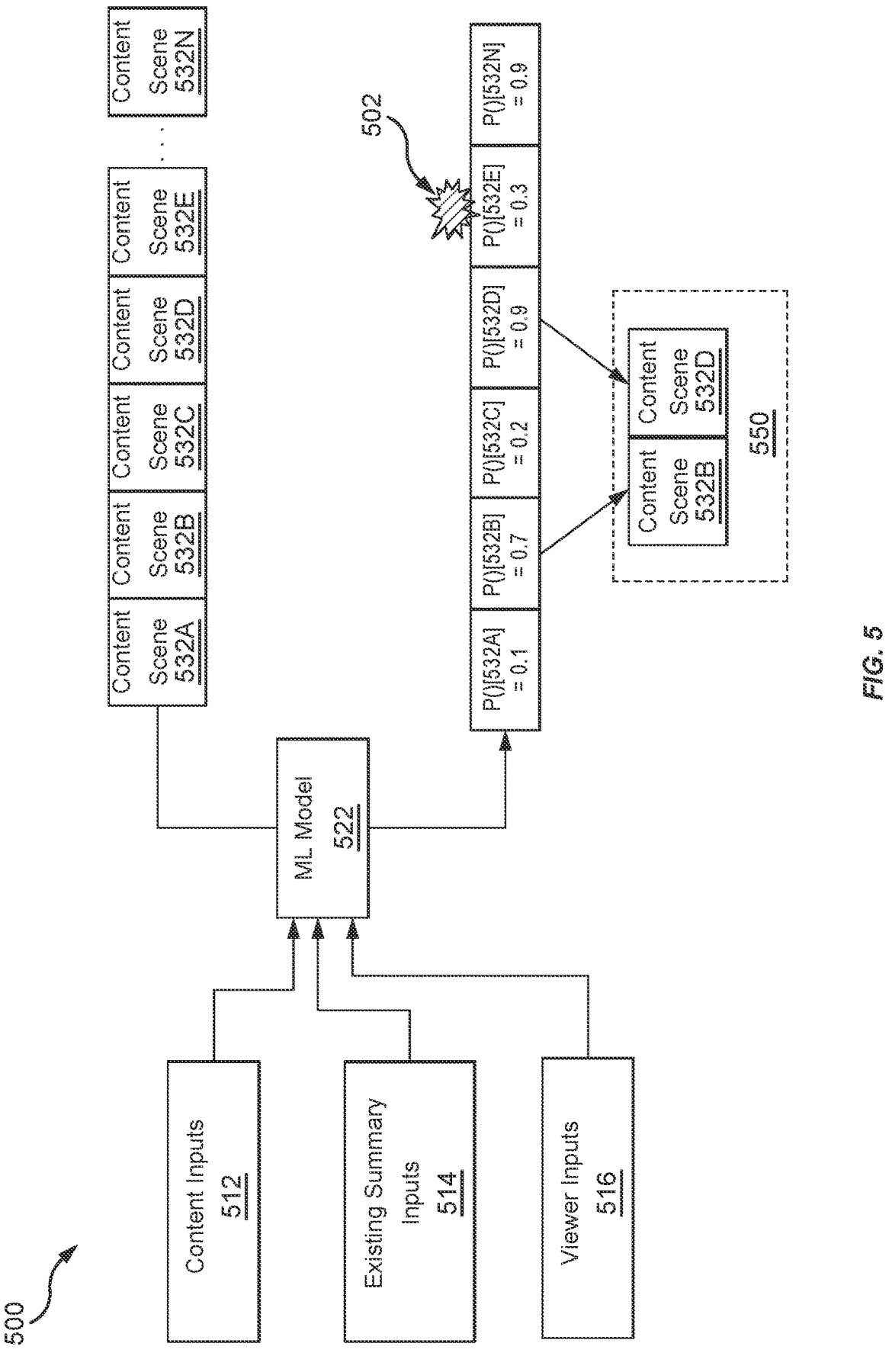
FIG. 5 illustrates generating customized content summaries using machine learning, according to at least one embodiment.

FIG. 5 illustrates generating customized content summaries using machine learning, according to at least one embodiment. A computing environment 500 includes an ML model 522 (e.g., the analysis ML model 126 illustrated in FIGS. 1-2) used to infer a customized content summary 550. In an embodiment, the ML model 522 selects from among content scenes 532A-N to include in the customized content summary 550. For example, the ML model 522 can use content inputs 512 and existing summary inputs 514 to infer a probability that each of the content scenes 532A-N should be included in the customized content summary 550.

In an embodiment, the content inputs 512 include content items (e.g., the content 112 illustrated in FIG. 1). The content items include the scenes 532A-N used to generate the customized content summary 550, and can include scenes from movies, TV shows, audio content, short video content, graphic novels, or any other suitable content. In an embodiment, the content inputs 512 can further include features (e.g., the features 114 illustrated in FIG. 1). These features can include dialogue, lighting, pacing, timestamps, other suitable metadata, or any other suitable features (e.g., relating to the content scenes 532A-N).

Further, the ML model 522 uses existing summary inputs 514 to select content scenes for the customized content summary 550. In an embodiment, the existing summary inputs 514 reflect whether particular scenes in the content inputs 512 are included in existing summaries (e.g., previously-on summaries, trailers, or other suitable existing summaries). For example, the content inputs 512 can include scenes from a movie or TV show. The existing summary inputs 514 can include boolean values indicating whether a given scene (e.g., any of the content scenes 532A-N) is included in an existing summary.

In an embodiment, the ML model 522 uses viewer inputs 516 to select content scenes for the customized content summary 550. In an embodiment, the viewer inputs 516 can reflect the length of time since the viewer last watched the content, characteristics of the viewer, preferences of the viewer, and any other suitable data. As discussed above in relation to FIG. 1A, the ML model 522 can use one or more of these viewer inputs 516 to select content scenes.

In an embodiment, an analysis service (e.g., the ML analysis service 124 illustrated in FIGS. 1A and 2) uses the ML model 522 to infer a probability that each of the content scenes 532A-N (e.g., where N is a variable indicating any arbitrary scene, among any arbitrary number of scenes) should be included in the customized content summary 550. As illustrated in FIG. 5, a viewer stops viewing the content at a point 502. The analysis service uses the content inputs 512, existing summary inputs 514, and viewer inputs 516 (or any suitable combination thereof) to infer a probability (e.g., a probability of 0.1 in the illustrated example) that the content scene 532A should be included in the customized content summary 550 for the viewer that stops viewing the content at the point 502.

In the illustrated example, the analysis service infers a probability of 0.7 that the content scene 532B should be included in the customized content summary 550, a probability of 0.2 that the content scene 532C should be included in the customized content summary 550, a probability of 0.9 that the content scene 532D should be included in the customized content summary 550, and a probability of 0.3 that the content scene 532E should be included in the customized content summary 550. The analysis service selects two scenes among the highest probability scores, content scenes 532B and 532D, and included these scenes in the customized content summary 550. This is merely an example, and the analysis service can use any suitable technique to identify content scenes for the customized content summary (e.g., the highest probabilities, probabilities above a threshold value, or any other suitable technique). In an embodiment, the analysis service infers a probability of 0.9 that the content scene 532N should be included in a customized content summary, but because the content scene 532N occurs after the viewer stopping point 502, the analysis service does not include the content scene 532N in the customized content summary 550.

In an embodiment, the ML model 522 is a suitable supervised ML model (e.g., a convolutional neural network (CNN) or other deep learning neural network (DNN)). This is merely an example, and the ML model 522 can be any suitable ML model (e.g., a decision tree, a random forest, a support vector machine, or any other suitable ML model). The ML model 522 can be trained using scene information that has been pre-processed and tagged with suitable scene and future information (e.g., manually tagged through human analysis or automatically tagged using a suitable computational system). A software training service can create feature vectors from the training data, and can use the feature vectors to train the ML Model 522 (e.g., by annotating the feature vectors with suitable metadata). The features can include the features 114 discussed above in relation to FIG. 1 (e.g., dialogue data, lighting data, pacing data, timestamp data, and any other suitable data relating to the content scenes), or any other suitable features. Further existing summary data can be used to train the ML model 522.

In an embodiment, training can be done as batch training. In this embodiment, all data is pre-processed at once (e.g., all training data), and provided to the training service. Alternatively, the training, pre-processing, or both can be done in a streaming manner. In this embodiment, the data is streaming, and is continuously provided to the training service. For example, it can be desirable to take a streaming approach for scalability. The set of training data may be very large, so it may be desirable to pre-process the data, and provide it to the training service, in a streaming manner (e.g., to avoid computation and storage limitations).

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, embodiments described herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations or block diagrams of methods, apparatuses (systems), and computer program products according to embodiments of the present disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations or block diagrams.

The flowchart illustrations and block diagrams in the Figures illustrate the architecture, functionality, and operation of possible implementations of systems, methods, and computer program products according to various embodiments of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams or flowchart illustrations, and combinations of blocks in the block diagrams or flowchart illustrations, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:

identifying a plurality of scenes relating to a first content item;

identifying a timestamp in the first content item indicating when a user stopped consuming the first content item at a first point in time;

determining, at a second point in time, that the user has returned to resume consuming the first content item;

in response to determining that the user has returned to resume consuming the first content item, selecting, using a computing system, two or more scenes, of the plurality of scenes, for a customized content summary for the user, comprising:

selecting the two or more scenes based on the identified timestamp, wherein the selected two or more scenes were previously presented to the user, prior to the timestamp in the first content item; and generating the customized content summary, using the computing system, by combining the selected two or more scenes.

2. The method of claim 1,
wherein at least one of the two or more scenes is from a second content item separate from the first content item,
wherein the first content item relates to a sequential series of content items, and
wherein the second content item occurs earlier in the sequential series of content items than the first content item.

3. The method of claim 2,
wherein the sequential series of content items comprises at least one of: (i) a television series, (ii) a movie series, or (iii) an audio content series.

4. The method of claim 2, wherein selecting the two or more scenes is based on at least one of: (i) identifying an existing summary relating to the first content item or (ii) using a machine learning (ML) model to infer the selection of the two or more scenes.

5. The method of claim 4, wherein the selecting the two or more scenes comprises:
identifying the existing summary relating to the first content item; and
determining that the at least one of the two or more scenes is included in the existing summary.

6. The method of claim 5,
wherein the existing summary is a previously-on summary associated with a third content item that occurs later in the sequential series of content items than the first content item.

7. The method of claim 4, wherein the selecting the two or more scenes comprises:
using the ML model to infer the selection of the two or more scenes.

8. The method of claim 7, wherein the ML model is a supervised ML model trained to determine a probability that each of the plurality of scenes should be included in the customized content summary.

9. The method of claim 8, wherein the ML model uses the existing summary relating to the first content item to infer the selection of at least one of the two or more scenes.

10. The method of claim 4, wherein the selecting the two or more scenes is further based on a duration of time since the user stopped consuming the first content item.

11. A non-transitory computer program product comprising:
one or more non-transitory computer readable media containing, in any combination, computer program code that, when executed by operation of any combination of one or more processors, performs operations comprising:
identifying a plurality of scenes relating to a first content item;
identifying a timestamp in the first content item indicating when a user stopped consuming the first content item at a first point in time;
determining, at a second point in time, that the user has returned to resume consuming the first content item;
in response to determining that the user has returned to resume consuming the first content item, selecting, using a computing system, two or more scenes, of the plurality of scenes, for a customized content summary for the user, comprising:
selecting the two or more scenes based on the identified timestamp, wherein the selected two or more scenes were previously presented to the user, prior to the timestamp in the first content item; and
generating the customized content summary by combining the selected two or more scenes.

12. The non-transitory computer program product of claim 11,
wherein at least one of the two or more scenes is from a second content item separate from the first content item,
wherein the first content item relates to a sequential series of content items, and
wherein the second content item occurs earlier in the sequential series of content items than the first content item.

13. The non-transitory computer program product of claim 12, wherein selecting the two or more scenes is based on at least one of: (i) identifying an existing summary relating to the first content item or (ii) using a machine learning (ML) model to infer the selection of the two or more scenes.

14. The non-transitory computer program product of claim 13, wherein the selecting the two or more scenes comprises:
identifying the existing summary relating to the first content item; and
determining that the at least one of the two or more scenes is included in the existing summary, and
wherein the existing summary is a previously-on summary associated with a third content item that occurs later in the sequential series of content items than the first content item.

15. The non-transitory computer program product of claim 13, wherein the selecting the two or more scenes comprises:
using the ML model to infer the selection of the two or more scenes,
wherein the ML model is a supervised ML model trained to determine a probability that each of the plurality of scenes should be included in the customized content summary, and
wherein the ML model uses the existing summary relating to the first content item to infer the selection of at least one of the two or more scenes.

16. A system, comprising:
one or more processors; and
one or more memories storing a program, which, when executed on any combination of the one or more processors, performs operations, the operations comprising:
identifying a plurality of scenes relating to a first content item;
identifying a timestamp in the first content item indicating when a user stopped consuming the first content item at a first point in time;
determining, at a second point in time, that the user has returned to resume consuming the first content item;
in response to determining that the user has returned to resume consuming the first content item, selecting, using a computing system, two or more scenes, of the plurality of scenes, for a customized content summary for the user, comprising:
selecting the two or more scenes based on the identified timestamp, wherein the selected two or more scenes were previously presented to the user, prior to the timestamp in the first content item; and
generating the customized content summary by combining the selected two or more scenes.

17. The system of claim 16, wherein at least one of the two or more scenes is from a second content item separate from the first content item, wherein the first content item relates to a sequential series of content items, and wherein the second content item occurs earlier in the sequential series of content items than the first content item.

18. The system of claim 17, wherein selecting the two or more scenes is based on at least one of: (i) identifying an existing summary relating to the first content item or (ii) using a machine learning (ML) model to infer the selection of the two or more scenes.

19. The system of claim 18, wherein the selecting the two or more scenes comprises:

identifying the existing summary relating to the first content item; and determining that the at least one of the two or more scenes is included in the existing summary, and wherein the existing summary is a previously-on summary associated with a third content item that occurs later in the sequential series of content items than the first content item.

20. The system of claim 18, wherein the selecting the two or more scenes comprises:

using the ML model to infer the selection of the two or more scenes, wherein the ML model is a supervised ML model trained to determine a probability that each of the plurality of scenes should be included in the customized content summary, and wherein the ML model uses the existing summary relating to the first content item to infer the selection of at least one of the two or more scenes.

\* \* \* \* \*